United States Patent
Kamihara

(10) Patent No.: US 8,268,499 B2
(45) Date of Patent: Sep. 18, 2012

(54) FUEL CELL SYSTEM

(75) Inventor: Tetsuya Kamihara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 2307 days.

(21) Appl. No.: 10/553,945

(22) PCT Filed: Jul. 13, 2004

(86) PCT No.: PCT/JP2004/010279
§ 371 (c)(1),
(2), (4) Date: Oct. 21, 2005

(87) PCT Pub. No.: WO2005/008821
PCT Pub. Date: Jan. 27, 2005

(65) Prior Publication Data
US 2006/0251938 A1    Nov. 9, 2006

(30) Foreign Application Priority Data
Jul. 22, 2003   (JP) ................ 2003-277654

(51) Int. Cl.
H01M 8/04   (2006.01)
(52) U.S. Cl. ......... 429/434; 429/430; 429/431; 429/442
(58) Field of Classification Search .............. 429/430, 429/431, 433, 434, 442
See application file for complete search history.

(56) References Cited

U.S. PATENT DOCUMENTS

| | | | |
|---|---|---|---|
| 2003/0003335 A1* | 1/2003 | Kazama et al. | 429/23 |
| 2003/0091881 A1 | 5/2003 | Eisler et al. | |
| 2004/0001985 A1* | 1/2004 | Alva | 429/26 |

FOREIGN PATENT DOCUMENTS

| | | |
|---|---|---|
| JP | 05-074477 A | 3/1993 |
| JP | 09-055219 A | 2/1997 |
| JP | 2002-083622 A | 3/2002 |
| JP | 2002-184435 A | 6/2002 |
| JP | 2002-280046 A | 9/2002 |
| JP | 2003-017105 A | 1/2003 |
| WO | WO 02/01657 A2 | 1/2002 |

* cited by examiner

*Primary Examiner* — Eugenia Wang
(74) *Attorney, Agent, or Firm* — Foley & Lardner LLP

(57) ABSTRACT

An aspect of the present invention provides a fuel cell system that includes a fuel cell stack (1) configured to provide electric power or electric current, a cooling unit (3, 4) configured to cool the fuel cell stack (1) by flowing a coolant through a coolant passage (2) provided in the fuel cell stack (1), an inlet temperature detecting unit (5) configured to detect the temperature of the coolant at the inlet of the fuel cell stack (1), and a control unit (21) configured to control the electric power or electric current extracted from the fuel cell stack (1) in accordance with the coolant temperature detected by the inlet temperature detecting unit (5).

16 Claims, 9 Drawing Sheets

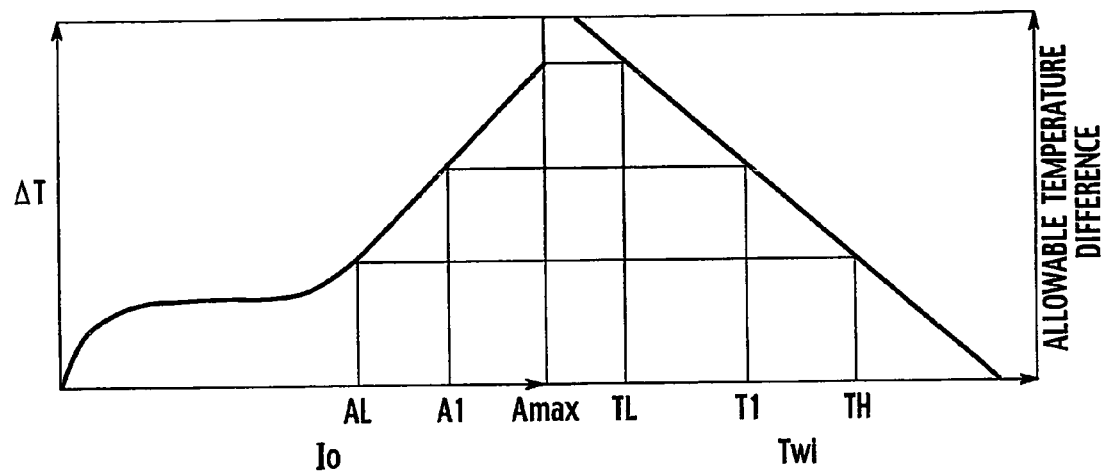
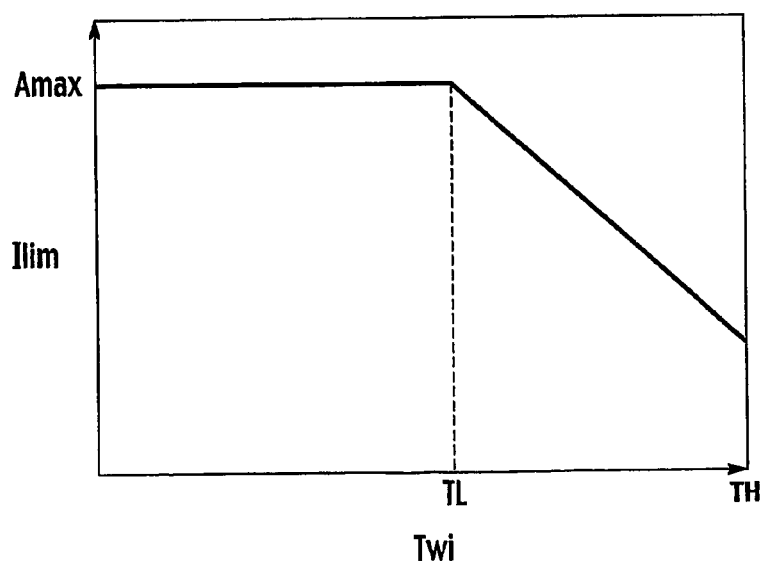

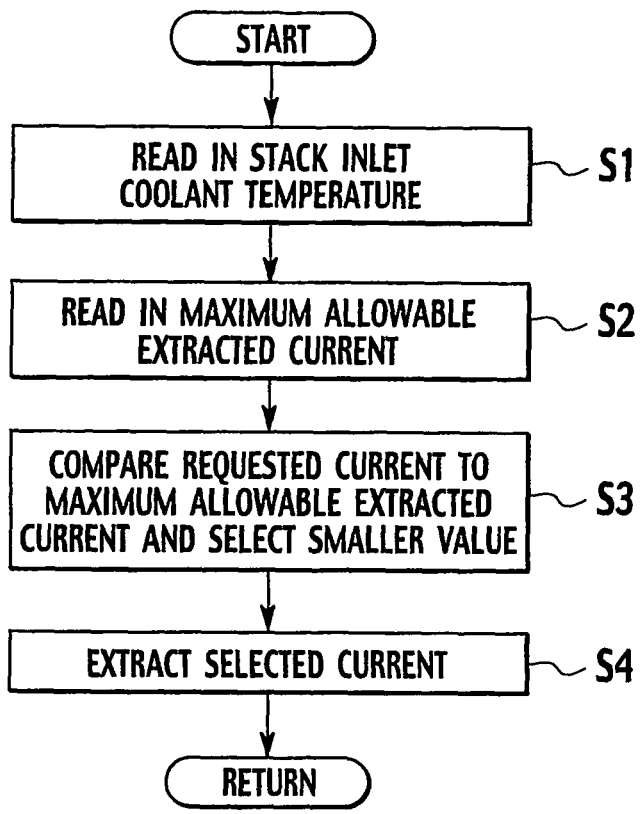
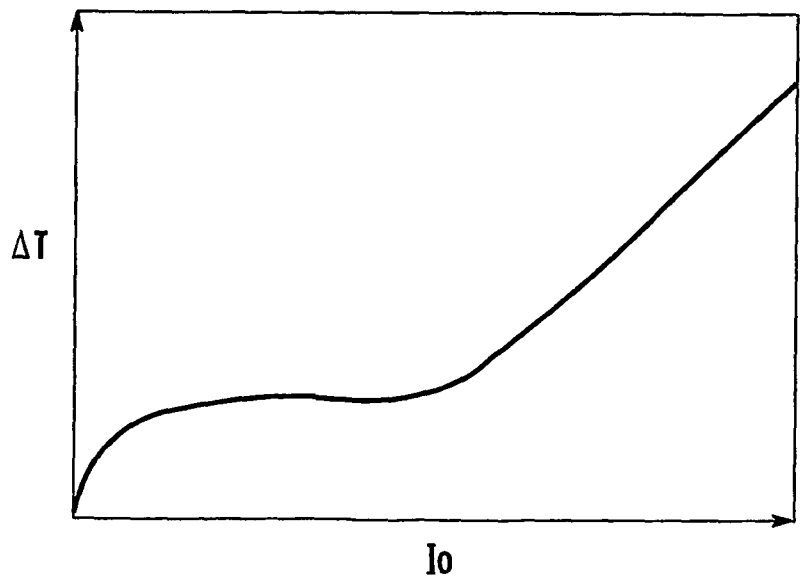

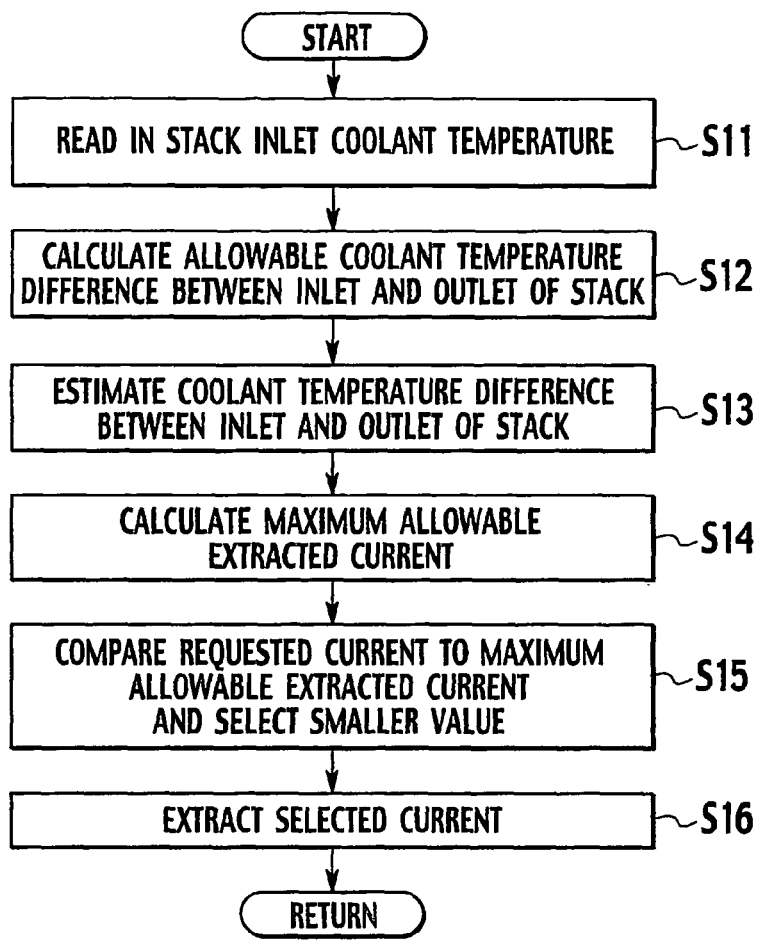
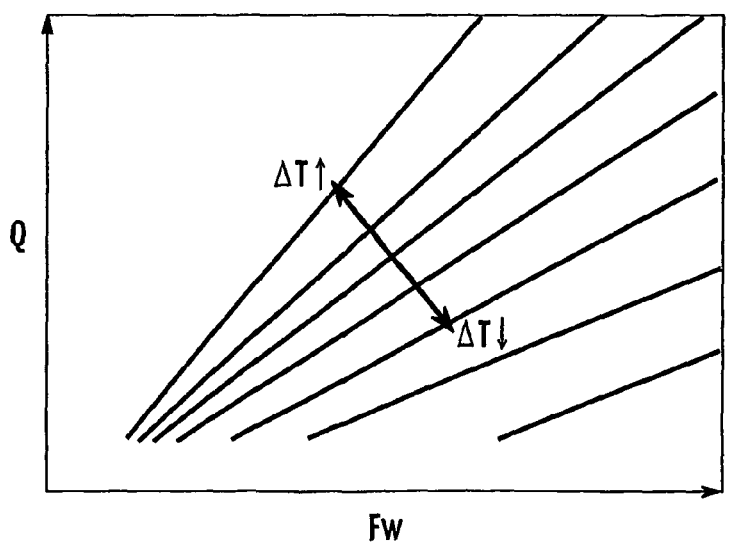

FUEL CELL SYSTEM

TECHNICAL FIELD

The present invention relates to a fuel cell system, more particularly, to a fuel cell system for protecting a fuel cell stack from excessive temperature increases to limit the electric power extracted (drawn) from a fuel cell.

BACKGROUND ART

In a fuel cell, hydrogen gas or other fuel gas and an oxidizing gas containing oxygen are separated by an electrolyte disposed there-between and reacted with each other electrochemically through the electrolyte. Electric energy is extracted directly from electrodes provided on both sides of the electrolyte. In particular, solid polymer fuel cells, which use a solid polymer electrolyte, are attracting attention as a power source for electric vehicles because of their low operating temperature and ease of handling. More specifically, a fuel cell vehicle is installed with a hydrogen storage device (such as a high pressure hydrogen tank, liquid hydrogen tank, or a hydrogen absorbing alloy), and hydrogen supplied from the hydrogen storage device and air containing oxygen are delivered into the fuel cell and reacted together. Electric energy extracted from the fuel cell is used to drive a motor connected to the drive wheels. Since the only exhaust substance is water, a fuel cell vehicle is extremely clean.

In a fuel cell system, energy held by the fuel that cannot be extracted as electric power is converted to heat. If the temperature of the fuel cell rises above a permissible temperature due to this heat, the fuel cell will be degraded. Consequently, fuel cell systems are provided with a cooling system that uses a coolant to absorb heat generated during electric power generation and release the heat outside the system through a radiator or other heat exchanger.

In the case of solid polymer fuel cells, the upper limit of the operating temperature is determined chiefly by the maximum tolerable temperature of the solid polymer electrolyte film and it is necessary to cool the fuel cell stack such that the upper limit temperature is not exceeded.

Japanese Laid-Open Patent Publication No. 05-074477 (page 3, FIG. 1) discloses a technology that limits the amount of electric power extracted from a fuel cell and curbs the amount of heat generated by the fuel cell when the cooling capacity is insufficient relative to the amount of generated heat.

The technology disclosed in said publication is configured to limit the output of a fuel cell plant in accordance with the outside air temperature when the outside air temperature is high and the cooling device cannot cool the fuel cells sufficiently, thereby preventing the fuel cells from being degraded by excessive temperatures.

DISCLOSURE OF INVENTION

However, since said disclosed technology calculates the upper limit of the output of the fuel cell based on the outside air temperature using an output limit value function generator, there are cases in which the output is limited based on the outside air temperature even though the coolant temperature is well below the maximum allowable temperature, i.e., even though the fuel cell system is in a state in which the maximum output can be extracted. In such cases, use of the desired amount of electric power is inhibited unnecessarily.

An aspect of the present invention provides a fuel cell system that includes a fuel cell stack configured to provide electric power or electric current, a cooling unit configured to cool the fuel cell stack by flowing a coolant through a coolant passage provided in the fuel cell stack, an inlet temperature detecting unit configured to detect the temperature of the coolant at the inlet of the fuel cell stack, and a control unit configured to control the electric power or electric current extracted from the fuel cell stack in accordance with the coolant temperature detected by the inlet temperature detecting unit.

BRIEF DESCRIPTION OF DRAWINGS

FIG. 3 illustrates the approach used in the embodiment with respect to limiting the current extracted from the fuel cell stack in accordance with the coolant temperature.

FIG. 4 is a plot of the maximum allowable current ($I_{lim}$) versus the inlet coolant temperature ($T_{wi}$) of the stack.

FIG. 5 is a flowchart showing the control processing executed by the controller 21 according to the first embodiment in order to limit the current that can be extracted from the stack.

FIG. 6 is a plot of the coolant temperature difference (delta T) between the inlet and outlet of the stack versus the electric current ($I_o$) extracted from the stack.

FIG. 7 is a flowchart showing the control processing executed by the controller 21 according to the second embodiment in order to limit the current that can be extracted from the stack.

FIG. 8 is a plot of the stack heat removal rate (Q) versus the stack coolant flow rate (Fw).

BEST MODE FOR CARRYING OUT THE INVENTION

Figure 1:
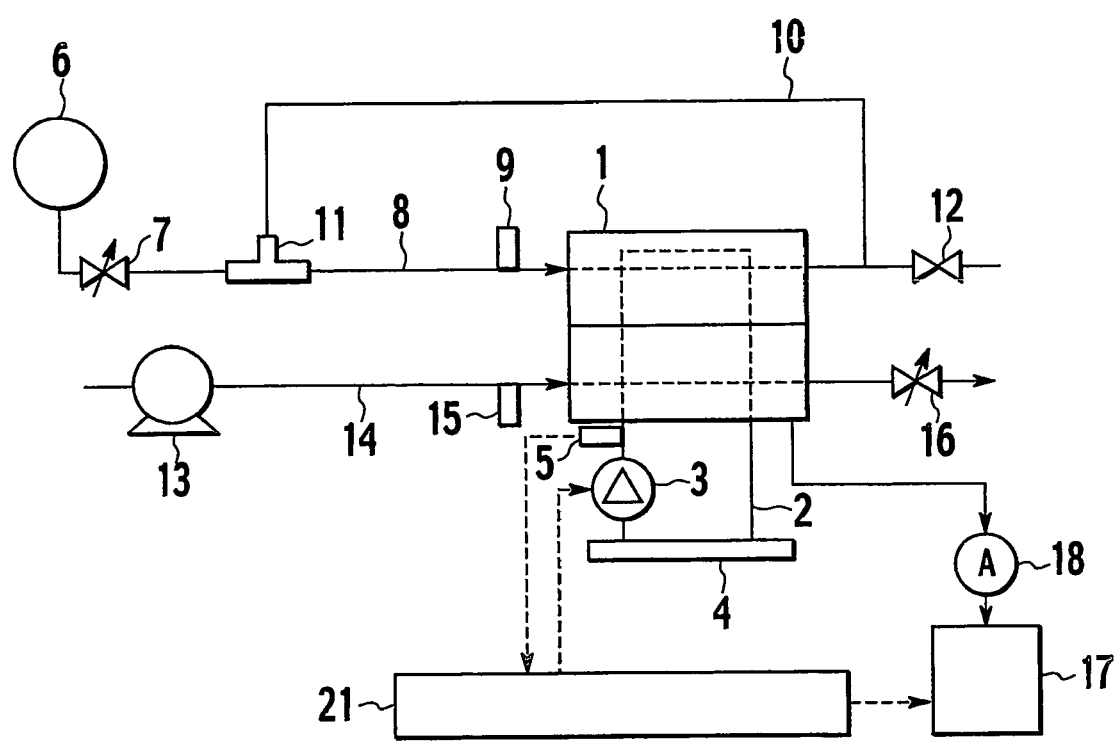
FIG. 1 is a diagrammatic view describing a fuel cell system in accordance with a first embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

FIG. 1 is a diagrammatic view describing a fuel cell system in accordance with a first embodiment. The fuel cell system has an excellent transient output characteristic and is well-suited to fuel cell vehicle applications In FIG. 1, the fuel cell stack 1 is made up of a plurality of cells stacked on one another to form a fuel cell stack. Each cell comprises a fuel cell structural body sandwiched between separators and each fuel cell structural body comprises an oxidant electrode and a fuel electrode arranged on opposite sides, respectively, of a solid polymer electrolyte membrane. Hydrogen is used as the fuel and air is used as the oxidant. The fuel cell stack 1 is cooled by a coolant that circulates through a coolant passage 2. A coolant pump 3 configured to circulate the coolant and a radiator 4 configured to radiate heat from the coolant to the outside of the system are provided in the coolant passage 2. An inlet temperature sensor 5 is also provided in the coolant passage 2 at the inlet of the fuel cell stack 1

A controller 21 controls the coolant pump 3 in accordance with the stack inlet coolant temperature detected by the inlet temperature sensor 5 and controls the electric power or electric current delivered from the fuel cell stack 1 to a load 17 according to the coolant temperature at the stack inlet detected by the inlet temperature sensor 5. An ammeter 18 provided between the fuel cell stack 1 and the load 17 detects the current value delivered to the load 17 from the fuel cell stack 1 and sends the current value to the controller 21.

A hydrogen tank 6 stores high-pressure hydrogen as a fuel gas. The hydrogen gas stored in the hydrogen tank 6 is delivered to the fuel cell stack 1 through a hydrogen supply pipe 8 after having its pressure adjusted by a variable throttle valve serving as a hydrogen pressure adjusting valve 7. The hydrogen pressure adjusting valve 7 is controlled by the controller 21 during normal operation such that the hydrogen supply pressure delivered to the fuel cell stack 1 and detected by the pressure sensor 9 is accurate. An ejector 11 is provided in the hydrogen supply pipe 8 between the hydrogen pressure adjusting valve 7 and the fuel cell stack 1. The excess hydrogen discharged from the fuel cell stack 1 is returned to the intake port of the ejector 11 through a hydrogen return pipe 10. By circulating the hydrogen with the ejector 11, the stability of the electricity generation performed by the fuel cell stack 1 can be maintained and the reaction efficiency can be improved. An on-off valve serving as a purge valve 12 is closed during normal operation, but when nitrogen diffused from the oxidant electrode has accumulated inside the hydrogen system or the fuel electrode of the fuel cell stack 1 has become blocked with water, the purge valve 12 opens in response to an open command received from the controller 21 and discharges the nitrogen or liquid water to the outside. A compressor 13 compresses air and the compressed air is delivered to the oxidant electrode of the fuel cell stack through an air supply pipe 14. A variable throttle valve serving as an air pressure adjusting valve 16 is provided in the outlet of the oxidant electrode. The controller 21 controls the opening degree of the air pressure adjusting valve 16 in accordance with the detection value of a pressure sensor 15 provided in the inlet of the oxidant electrode so that residual air whose oxygen has been consumed is discharged from the outlet of the oxidant electrode while maintaining an appropriate air pressure in the oxidant electrode.

Figure 2A:
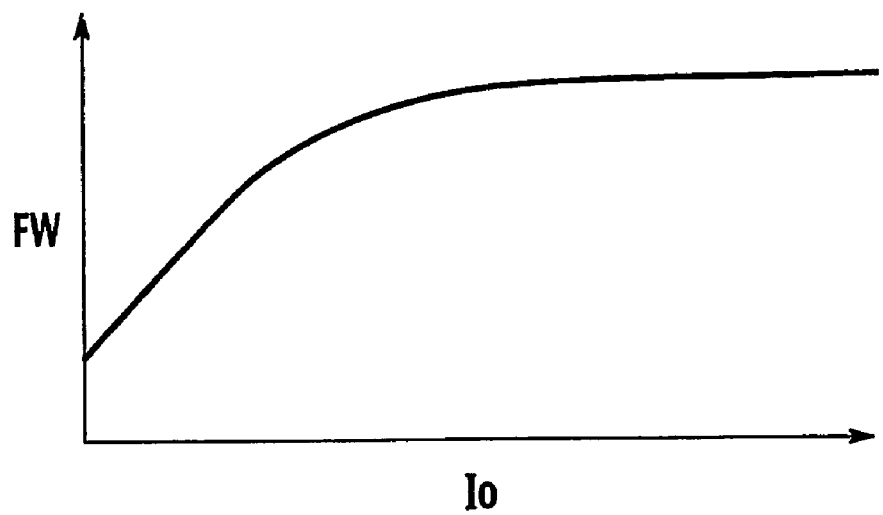
FIG. 2A is a plot of the coolant flow rate of the fuel cell stack 1 (FW) versus the electric current ($I_o$) extracted from the fuel cell stack 1.
Figure 2B:
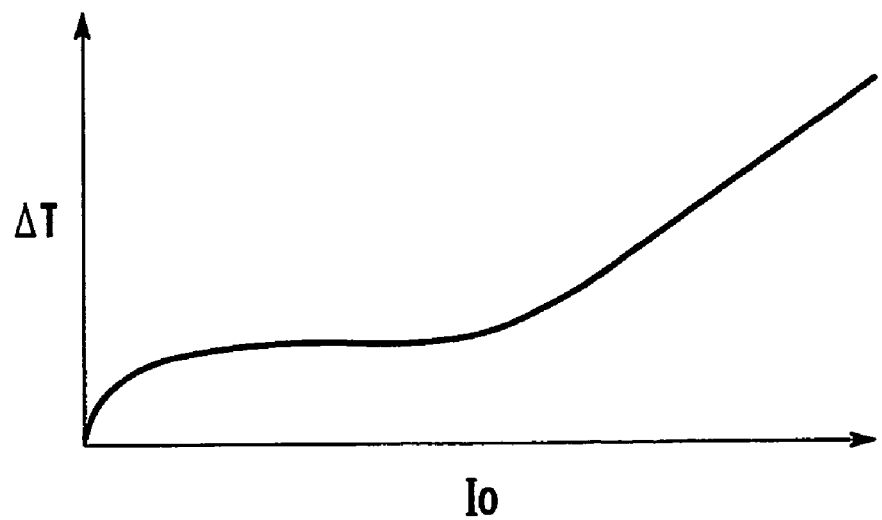
FIG. 2B is a plot of the coolant temperature difference between the inlet and outlet of the stack (delta T) versus the electric current ($I_o$) extracted from the fuel cell stack 1.

FIG. 2A is a plot of the coolant flow rate of the fuel cell stack 1 (FW) versus the electric current extracted from the fuel cell stack 1 ($I_o$), and FIG. 2B is a plot of the coolant temperature difference between the inlet and outlet of the stack (delta T) versus the electric current extracted from the fuel cell stack 1 ($I_o$). As shown in FIG. 2A, in this embodiment the coolant flow rate of the coolant pump 3 is approximately constant in the range of medium to high extracted currents $I_o$. As a result, as shown in FIG. 2B, the coolant temperature difference (delta T) between the inlet and outlet of the stack increases as the current $I_o$ increases in the range of medium to high currents.

FIG. 3 illustrates the approach used in the embodiment with respect to limiting the current extracted from the fuel cell stack in accordance with the coolant temperature. The coolant temperature $T_{wo}$ at the outlet of the stack has the highest correlation with the internal temperature of the stack. Therefore, the allowable temperature difference between the inlet coolant temperature $T_{wi}$ and the outlet coolant temperature $T_{wo}$ of the stack shown on the vertical axis of the right-hand graph in FIG. 3 is given by Equation (1) and is a straight line that slopes down and to the right with respect to the inlet coolant temperature $T_{wi}$ of the stack.

Allowable temperature difference=coolant outlet maximum allowable temperature−stack inlet coolant temperature (1)

When the stack inlet coolant temperature $T_{wi}$ is equal to or below $T_L$ (° C.), it is not necessary to limit the electric current $I_o$ extracted from the stack because the stack outlet coolant temperature will be equal to or below the allowable temperature even if the electric current $I_o$ extracted from the stack is as high as the maximum current $A_{max}$.

If the stack inlet coolant temperature $T_{wi}$ rises to a temperature $T_1$ (° C.), the outlet coolant temperature will not exceed the maximum allowable temperature so long as the extracted current $I_o$ is limited to a current $A_1$ (A). Also, in connection with the capacity of the radiator and expectable maximum outside air temperature, it is acceptable for the characteristic curve of the coolant temperature difference (delta T) between the inlet and outlet versus the electric current $I_o$ rise to the right after currents of $A_L$(A) and higher are reached as long as the system is designed such that the radiator can discharge the necessary amount of heat for extracted electric currents $I_o$ as high as $A_L$ (A).

With the approach just described, the maximum electric current $A_{max}$ (A) that can be extracted is determined with respect to the stack inlet coolant temperature $T_{wi}$ as shown in FIG. 4. More specifically, the maximum current $A_{max}$ (A) can be extracted from the fuel cell stack 1 when the stack inlet coolant temperature $T_{wi}$ is equal to or below $T_L$ (° C.), and the maximum allowable current $I_{lim}$ that can be extracted (outputted) is limited such that the maximum allowable current $I_{lim}$ decreases proportionally to the difference $T_{wi}-T_L$ when $T_{wi}$ exceeds $T_L$ (° C.).

FIG. 5 is a flowchart showing the control processing executed by the controller 21 of this embodiment in order to limit the current that can be extracted from the stack.

In step S1 the controller 21 reads in the stack inlet coolant temperature $T_{wi}$ from the inlet temperature sensor 5 and in step S2 the controller 21 uses the map shown in FIG. 4 to read in the maximum allowable extracted current $I_{lim}$ based on the stack inlet coolant temperature $T_{wi}$. It is also acceptable to use an equivalent calculation instead of the map.

In step S3 the controller 21 compares the requested output current requested by the user such as a driver of an automobile with the maximum allowable extracted current and selects the smaller current value as the current to be extracted. In step S4 the system extracts the selected current.

When a fuel cell is used as the power source of a vehicle, the capacity of the radiator that is used to discharge the heat generated by the fuel cell to the outside occasionally becomes insufficient. The reason is that although the rate at which the radiator is required to discharge heat is approximately the same for both regular internal combustion engines and fuel cells, the maximum coolant operating temperature that fuel cells can allow is lower than that of internal combustion engines. In this case, it is harder for the radiator of fuel cells to secure a temperature difference between the outside air and the coolant compared to the radiator of regular internal combustion engines. In short, with fuel cells, there are times when sufficient cooling capacity cannot be obtained with the size of radiator that can be installed in a vehicle.

With this embodiment, even under conditions where the radiator capacity becomes insufficient because of an increase the outside air temperature, the stack outlet coolant temperature can be controlled such that it does not exceed the maximum allowable temperature and degradation of the stack caused by excessive temperature can be prevented.

Also, controlling the coolant temperature in this way, a large load can be extracted even if the outside air temperature is high so long as the coolant temperature is low. As a result, unnecessary reductions in vehicle power performance can be curbed.

Another feasible method is to monitor the temperature of the coolant at the outlet of the fuel cell (which temperature has a high correlation with the maximum temperature inside the fuel cell) and limit the load in accordance with the outlet coolant temperature when the outlet coolant temperature exceeds a prescribed temperature.

Figure 15A:
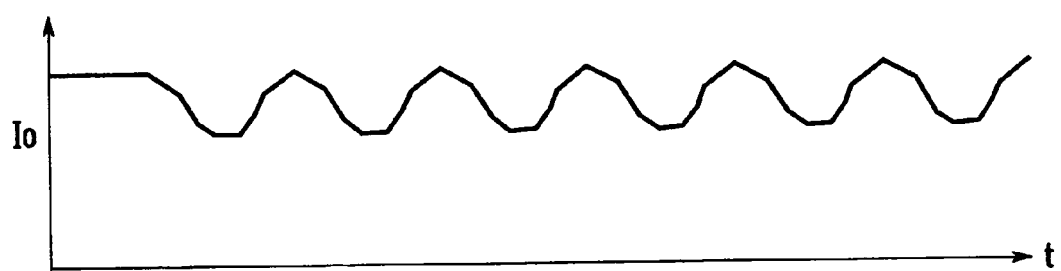
FIG. 15A is a plot of electric current ($I_o$) extracted from the fuel cell stack versus time (t)
Figure 15B:
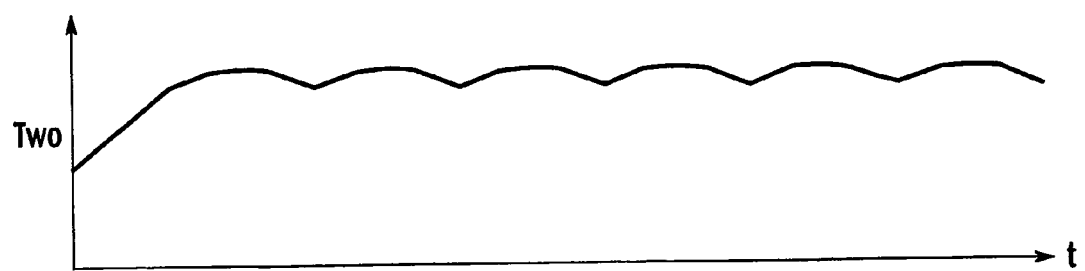
FIG. 15B is a plot of outlet coolant temperature ($T_{wo}$) of the fuel cell stack versus time (t).

Meanwhile, as shown in FIG. 15, with a conventional control method the load is repeatedly limited when the stack outlet coolant temperature $T_{wo}$ rises and released from limiting when the load limit causes the stack outlet coolant temperature $T_{wo}$ to decrease. As a result, the maximum load undergoes hunting, i.e., repeated rising and falling, and electric power delivered by the fuel cell and used as the drive power of the vehicle repeatedly increases and decreases, causing the driver of the vehicle to experience a feeling that something is abnormal.

By limiting the extraction current according to the coolant temperature at the inlet of the fuel cell stack, this embodiment can limit the output of the fuel cell smoothly and avoid causing the driver to experience a feeling that something is abnormal.

Additionally, by setting the coolant flow rate in such a manner that, at least in a high load region, the coolant temperature difference between the inlet and outlet of the fuel cell increases as the output of the fuel cell increases, this embodiment can strengthen the effect of suppressing the aforementioned hunting and limit the output of the fuel cell even more smoothly.

Second Embodiment

This embodiment is configured to estimate the coolant temperature difference between the inlet and outlet of the stack versus the electric current and limit the extracted electric current in such a manner that the estimated value of the coolant temperature at the outlet of the stack, i.e., the sum of the coolant temperature at the inlet of the stack and said estimated temperature difference, does not exceed a prescribed value.

Like the first embodiment, this embodiment features setting the coolant flow rate in such a manner that the coolant temperature difference between the inlet and outlet of the stack increases as the extracted electric current increases when the system is operating in a high load region where it is possible that the extracted electric current will be limited.

Consequently, in this embodiment, a control map like that shown in FIG. 6 is created by measuring in advance the coolant temperature difference (delta T) between the inlet and outlet of the stack with respect to the electric current $I_o$ extracted from the stack and the control map is stored in the controller 21.

The operations executed by the controller 21 of this embodiment in order to limit the electric current extracted from the fuel cell stack will now be described with reference to the flowchart shown in FIG. 7.

First, in step S11, the controller 21 reads in the stack inlet coolant temperature $T_{wi}$ from the inlet sensor 5, and in step S12 the controller 21 calculates the allowable value of the coolant temperature difference between the inlet and outlet of the stack. The allowable value can be calculated by subtracting the stack inlet coolant temperature read in step S11 from a prescribed value, i.e., the maximum allowable stack outlet coolant temperature.

In step S13 the controller 21 reads in the coolant temperature difference between the inlet and outlet of the stack from the map shown in FIG. 6, and in step 14 the controller 21 calculates the maximum allowable extracted current based on the results of steps S12 and S13. The maximum allowable extracted current is the current that, when extracted, causes the sum of the stack inlet coolant temperature and the estimated coolant temperature difference between the inlet and outlet of the stack to equal the maximum allowable stack outlet coolant temperature.

In step S15 the controller 21 selects the smaller current value between the requested current and the maximum allowable extracted current, and in step S16 the controller 21 extracts the selected current value and delivers it to the load.

The second embodiment provides exactly the same effects as the first embodiment. The second embodiment makes it possible at all times to extract the maximum electric current that can be extracted without causing the stack to be degraded by excessive temperatures and to limit the current smoothly without causing the driver to experience a feeling that something is abnormal.

Third Embodiment

Figure 9:
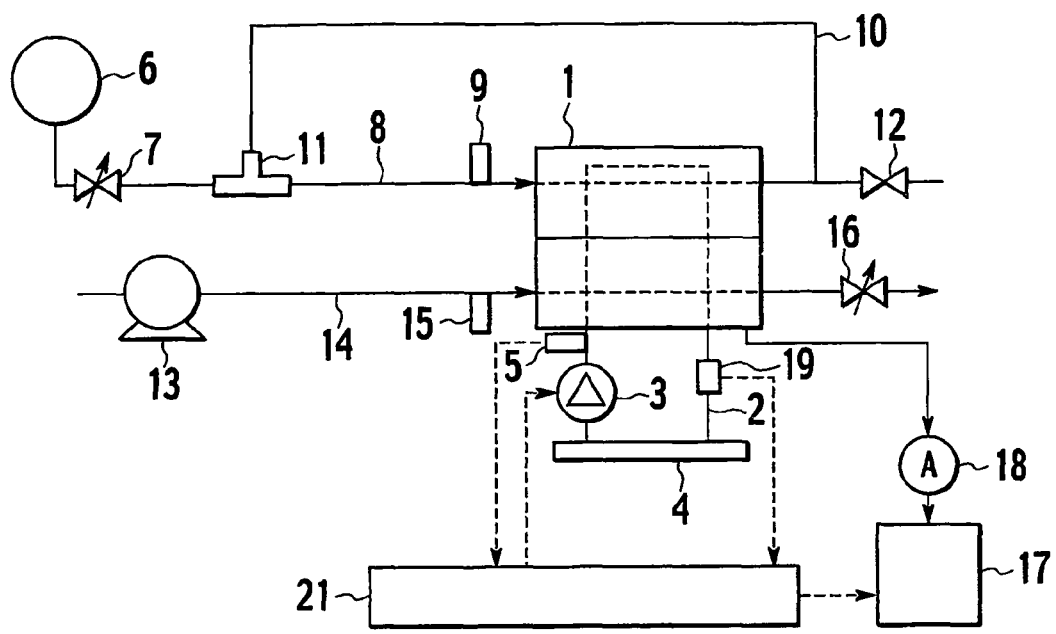
FIG. 9 is a system configuration diagram describing the constituent features of a fuel cell system in accordance with a third embodiment.

FIG. 9 is a system configuration diagram describing the constituent features of a fuel cell system in accordance with a third embodiment. The basic concept of this embodiment is the same as the second embodiment, the difference being that the precision with which the coolant temperature difference between the inlet and outlet of the stack is estimated has been improved over that achieved with step S13 of FIG. 7. Consequently, the diagram of FIG. 9 has a coolant flow meter added to the coolant passage 2. Otherwise, the constituent features are the same as the first embodiment shown in FIG. 1; identical constituent components are indicated with the same reference symbols and redundant descriptions thereof are omitted.

FIG. 8 illustrates the relationships between the stack coolant flow rate, the stack heat removal rate (i.e., the rate at which heat is removed from the stack by the coolant), and the coolant temperature difference between the inlet and outlet of the stack. As shown in FIG. 8, the even if the stack heat removal rate is constant, the coolant temperature difference (delta T) between the inlet and outlet of the stack will change if the coolant flow rate of the stack changes.

The coolant used is, for example, an antifreeze liquid made up of a mixture of purified water and ethylene glycol. This embodiment is conceived in view of situations where the coolant flow rate exhibits dispersive variation even if the rotational speed of the coolant pump 3 is held constant, such as a situation in which the proportions of the coolant mixture cannot be sufficiently managed after the fuel cell system leaves the factory.

Figure 10:
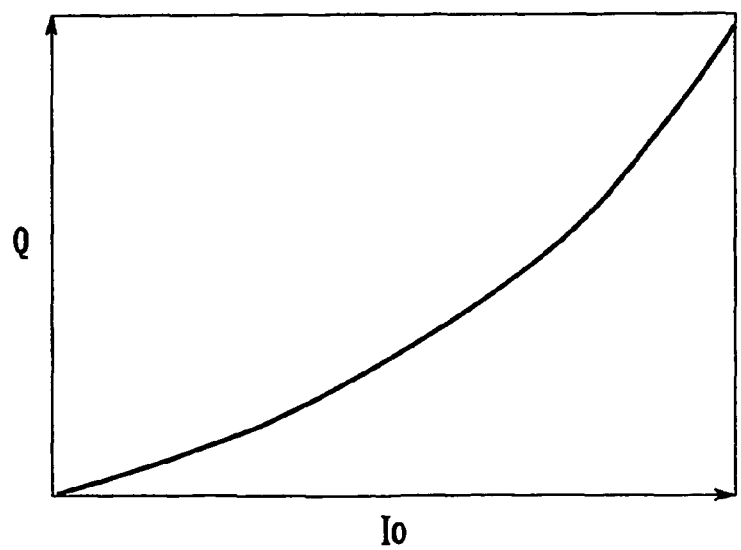
FIG. 10 is an example of a map for finding the stack heat removal rate based on the current extracted from the stack.

FIG. 10 is an example of a map for finding the stack heat removal rate based on the current extracted from the stack. The coolant temperature difference (delta T) between the inlet and outlet of the stack can be calculated by storing a map like that shown in the figure of the stack heat removal rate Q (J/s) versus the current $I_o$ extracted from the stack in the controller 21 in advance and using Equation (2) while referring to the map.

$$\text{coolant temperature difference (delta } T\text{) between inlet and outlet of stack}=(\text{stack heat removal rate } Q)/(\text{coolant flow rate } Fw) \quad (2)$$

In this embodiment, the estimation of the coolant temperature difference between the inlet and outlet of the stack executed in step S13 of FIG. 7 is executed, instead, by referring to maps that store the characteristics shown in FIGS. 8 and 10. As a result, even if the coolant flow rate exhibits dispersive variation, the output current can be limited with good precision.

Figure 11:
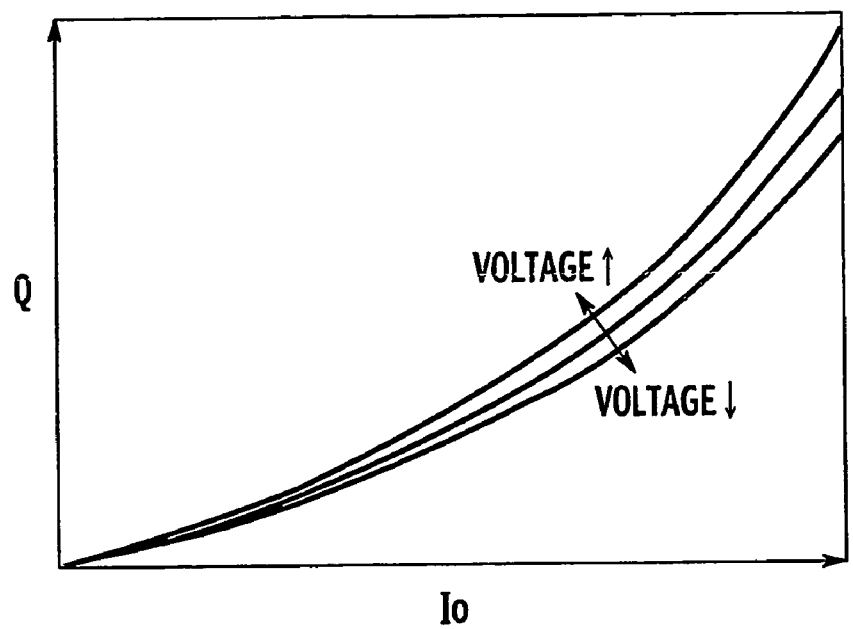
FIG. 11 illustrates the effect of the stack efficiency on the stack heat removal rate.

FIG. 11 illustrates the effect of the stack efficiency on the stack heat removal rate. The rate of heat removal from the stack is affected by the temperature of the stack and by dispersive variance in the efficiency of the stack. FIG. 11 shows the variation in the heat removal rate resulting from variation of the stack efficiency. At a given current, the output voltage of the stack decreases and the heat removal rate increases when the stack efficiency is low.

Figure 12:
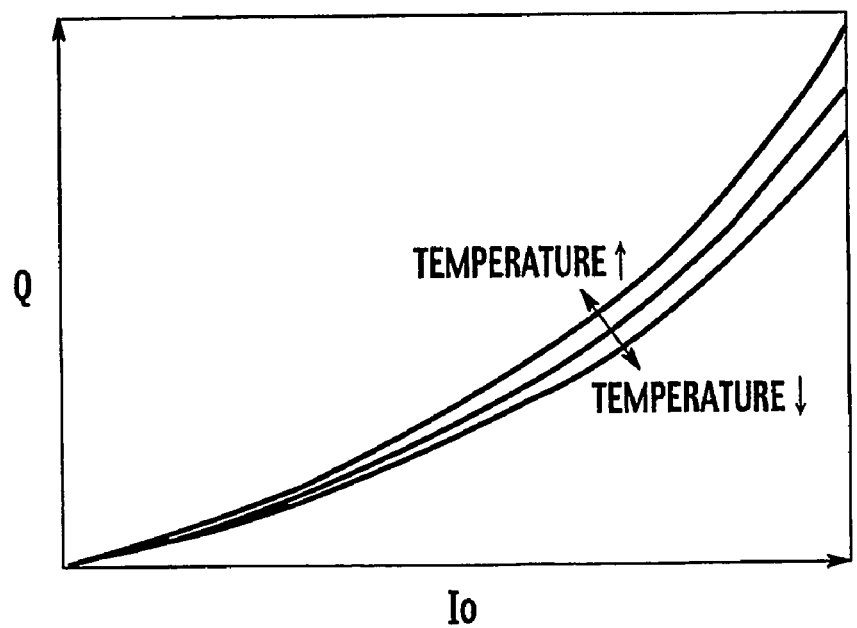
FIG. 12 illustrates the effect of the stack temperature on the stack heat removal rate.

FIG. 12 illustrates the effect of the stack temperature on the stack heat removal rate. When the stack temperature is low, the stack efficiency declines and the water produced inside the stack becomes liquid water. As a result, the rate at which heat is transferred to the coolant increases by an amount corresponding to the heat of condensation in comparison with a case in which the water is discharged from the air pressure adjusting valve 16 as steam.

Therefore, a highly precise estimation can be accomplished by referring to maps that store the characteristics shown in FIGS. 11 and 12 instead of a map that stores the characteristic shown in FIG. 10.

By estimating the heat removal rate as just described, the extracted current can be limited with even higher precision.

Fourth Embodiment

Figure 13:
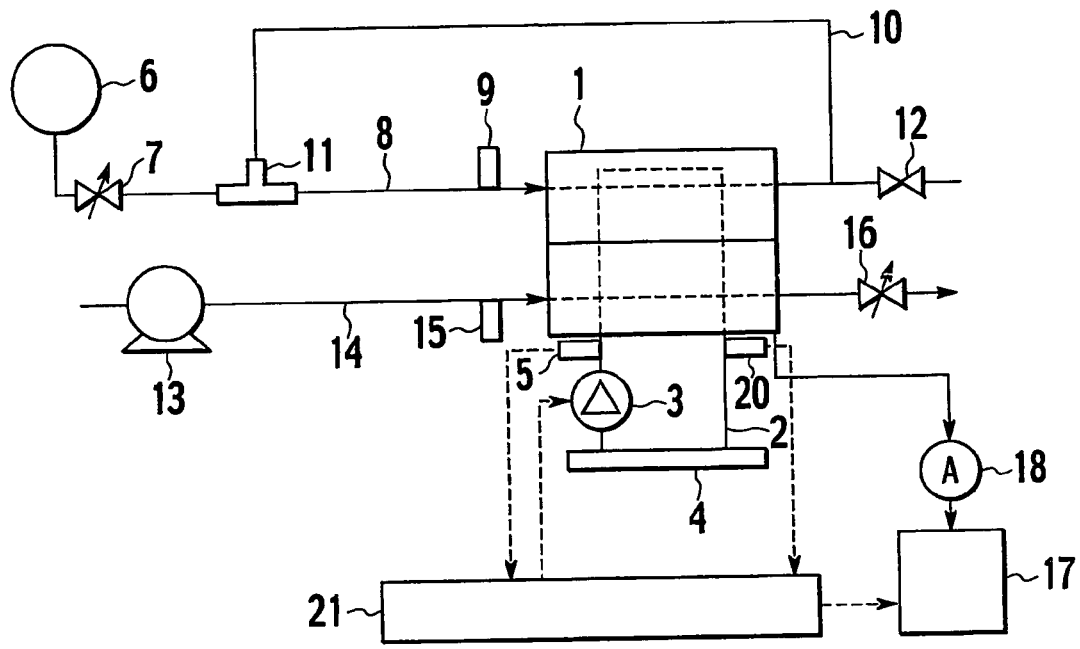
FIG. 13 is a system configuration diagram describing the constituent features of a fuel cell system in accordance with a fourth embodiment.

FIG. 13 is a system configuration diagram describing the constituent features of a fuel cell system in accordance with a fourth embodiment. As shown in FIG. 13, this embodiment is further provided with an outlet temperature sensor 20 configured to detect the stack outlet coolant temperature. Otherwise, the constituent features are the same as the first embodiment shown in FIG. 1; identical constituent components are indicated with the same reference symbols and redundant descriptions thereof are omitted.

Figure 14:
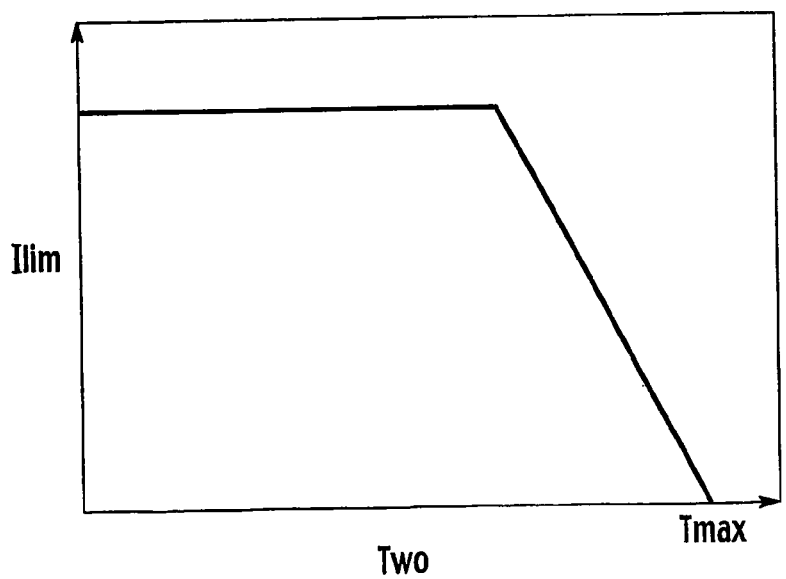
FIG. 14 is a plot of the maximum allowable extracted current ($I_{lim}$) versus the stack outlet coolant temperature ($T_{wo}$).

FIG. 14 is a plot of the maximum allowable extracted current versus the stack outlet coolant temperature. The controller 21 of this embodiment is configured to limit the extracted current based on the stack inlet coolant temperature as described heretofore in the first to third embodiments and, additionally, to limit the current based on the stack outlet coolant temperature as shown in FIG. 14.

During normal operation, the current limiting is set such that current limiting based on the stack inlet coolant temperature is triggered before current limiting based on the stack output coolant temperature. In other words, an extracted current limit value $I_{lim1}$ determined based on the inlet coolant temperature $T_{wi1}$ is set to be smaller than an extracted current limit $I_{lim1'}$ determined based on the outlet coolant temperature $T_{wo1}$, which corresponds to the sum of the inlet coolant temperature $T_{wi1}$ and the coolant temperature difference (delta $T_1$) resulting from said current $I_{lim1}$ ($T_{wi1}$+delta $T_1$).

Meanwhile, when a coolant abnormality causes the fluidity of the coolant to decline, when contaminants in the coolant passage have increased the resistance of the coolant passage, or when the flow rate of the coolant has declined due to degradation of the coolant pump, the temperature difference between the inlet and the outlet becomes larger than normal and the current limit value based on the stack output coolant temperature becomes smaller than the current limit value based on the stack inlet coolant temperature. Under such conditions, extracted current limiting based on the stack outlet coolant temperature is triggered before current limiting based on the stack input coolant temperature.

As explained previously, it is important to keep the stack outlet coolant temperature from exceeding a prescribed value in order to avoid degrading the stack.

When the electric current is limited based on the stack outlet coolant temperature, degradation of the stack due to excessive temperatures is prevented with greater certainty than when the extracted current is limited based on the stack inlet coolant temperature as described in the first to third embodiments of the present invention. However, with current limiting based on the stack outlet coolant temperature alone, the extracted current will fluctuate as described earlier with reference to FIGS. 15A and 15B and the resulting drive force fluctuations will cause the driver to experience a feeling that something is abnormal.

Since this embodiment sets the current limit values such that extracted current limiting based on the inlet temperature is triggered before current limiting based on the outlet temperature, smooth limiting can be accomplished and the degradation of the stack due to excessive temperatures can be prevented more reliably.

Although the extracted electric current is limited in the previously described embodiments, exactly the same effects can be achieved by limiting the extracted electric power using a similar method.

In this way, the fuel cell system according to the embodiments above, temperature detecting unit detects the coolant temperature at the inlet of the fuel cell stack using an inlet, and the control unit limits the electric power or electric current extracted from the fuel cell stack according to the coolant temperature at said inlet. As a result, degradation of the fuel cell system caused by excessive temperatures can be prevented while extracting the maximum possible power or current.

The present invention has the effect of making it possible to provide a fuel cell system in which the output of the fuel cell can be limited smoothly and the fuel cell can be prevented from degrading due to excessive temperatures when the rate at which heat is removed from the fuel cell becomes insufficient. The present invention accomplishes this effect by limiting the electric power or electric current extracted from the fuel cell stack in accordance with the coolant temperature at the inlet of the fuel cell stack.

Additionally, the present invention has the effect of making it possible to provide a fuel cell system that can curb excessive limitation of the extracted electric power or electric current and deliver the maximum possible electric power or electric current to the load.

The entire contents of Japanese Patent Application No. 2003-277654 filed on Jul. 22, 2003 are hereby incorporated by reference.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

INDUSTRIAL APPLICABILITY

The following are examples of applications in which the present invention can be applied: fuel cell automobiles, railroad vehicles capable of traveling through areas where electric power service is not available, and stationary fuel cell systems.

The invention claimed is:

1. A fuel cell system, comprising:
a fuel cell stack configured to provide electric power or electric current;
a cooling unit configured to cool the fuel cell stack by flowing a coolant through a coolant passage provided in the fuel cell stack;
an inlet temperature detecting unit configured to detect the temperature of the coolant at an inlet of the fuel cell stack; and
a control unit configured to control the electric power or electric current extracted from the fuel cell stack in accordance with the coolant temperature detected by the inlet temperature detecting unit and configured to set a limit value of the electric power or electric current extracted from the fuel cell stack in such a manner that the higher said coolant temperature becomes, the lower said limit value is set.

2. The fuel cell system of claim 1, wherein
the control unit is configured to set said limit value to a fixed value until the coolant temperature reaches a prescribed temperature and lowers the limit value when the coolant temperature exceeds the prescribed temperature.

3. The fuel cell system of claim 2, wherein
when said coolant temperature exceeds the prescribed temperature, the control unit is configured to set said limit value in such a manner that the extracted current becomes lower as said coolant temperature becomes higher.

4. The fuel cell system of claim 1, wherein the control unit is configured to perform the following processes:
receive the coolant temperature detected by the inlet temperature detecting unit;
obtain a maximum electric current allowed to be extracted from the fuel cell stack based on said coolant temperature;
compare a requested electric current to the maximum electric current allowed to be extracted; and
select the smaller of the compared electric currents.

5. The fuel cell system of claim 1, wherein the control unit is configured to perform the following processes:
receive the coolant temperature detected by the inlet temperature detecting unit;
calculate an allowable value for the coolant temperature difference between the inlet and outlet of the fuel cell stack based on said coolant temperature;
estimate the coolant temperature difference between the inlet and outlet of the fuel cell stack based on the allowable value for the coolant temperature difference between the inlet and outlet of the fuel cell stack;
obtain a maximum electric current allowed to be extracted from the fuel cell stack based on the coolant temperature difference between the inlet and outlet of the fuel cell stack;
compare a requested electric current to the maximum electric current allowed to be extracted; and
select the smaller of the compared electric currents.

6. The fuel cell system of claim 1, further comprising:
an outlet temperature estimating unit configured to estimate the temperature of the coolant at an outlet of the fuel cell stack; wherein
the control unit controls the electric power or electric current extracted from the fuel cell stack in accordance with the temperature of the coolant at the outlet of the fuel cell stack estimated by the outlet temperature estimating unit.

7. The fuel cell system of claim 6, further comprising:
a coolant flow rate detecting unit configured to detect the flow rate of the coolant either directly or indirectly; and
a heat removal rate estimating unit configured to estimate the rate at which heat is transferred from the fuel cell stack to the coolant.

8. The fuel cell system of claim 7, wherein
the outlet temperature estimating unit is configured to estimate the coolant temperature at the outlet of the fuel cell stack based on the coolant flow rate detected by the coolant flow rate detecting unit and the heat removal rate estimated by the heat removal rate estimating unit.

9. The fuel cell system of claim 8, wherein
the heat removal rate estimating unit is configured to estimate the heat removal rate based on the electric power or electric current extracted from the fuel cell stack.

10. The fuel cell system of claim 9, further comprising:
a stack temperature detecting unit configured to detect the temperature of the fuel cell stack either directly or indirectly.

11. The fuel cell system of claim 10, wherein
the heat removal rate estimating unit is configured to estimate the heat removal rate based on the electric power or electric current extracted from the fuel cell stack and the temperature of the fuel cell stack detected by the stack temperature detecting unit.

12. The fuel cell system of claim 8, wherein
the heat removal rate estimating unit is configured to estimate the heat removal rate based on the electric power or electric current extracted from the fuel cell stack and the output voltage of the fuel cell stack.

13. The fuel cell system of claim 6, further comprising:
a coolant flow rate setting unit configured to set the flow rate of the coolant in such a manner that, at least in a high load region of the fuel cell, the difference between the coolant temperature at the inlet of the fuel cell stack and the estimated coolant temperature at the outlet of the fuel cell stack increases as the output of the fuel cell stack increases.

14. The fuel cell system of claim 6, further comprising:

an outlet temperature detecting unit configured to detect the temperature of the coolant at the outlet of the fuel cell stack.

15. The fuel cell system of claim 14, wherein the control unit limits the electric power or electric current extracted from the fuel cell stack when the temperature detected by the outlet temperature detecting unit exceeds a prescribed value.

16. The fuel cell system of claim 15, wherein when the coolant temperature is rising, the control unit is configured to set said prescribed value in such a manner that the electric power or electric current extracted from the fuel cell stack is limited based on the temperature of the coolant at the inlet of the fuel cell stack before it is limited based on the temperature of the coolant at the outlet of the fuel cell stack while the coolant temperature rises.

* * * * *